(No Model.)
E. S. LEAYCRAFT.
BICYCLE CHAIN ADJUSTMENT.
No. 601,346. Patented Mar. 29, 1898.
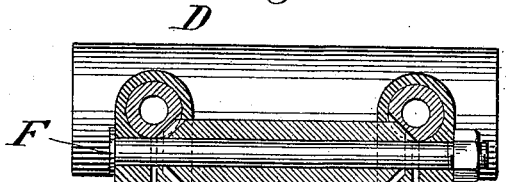
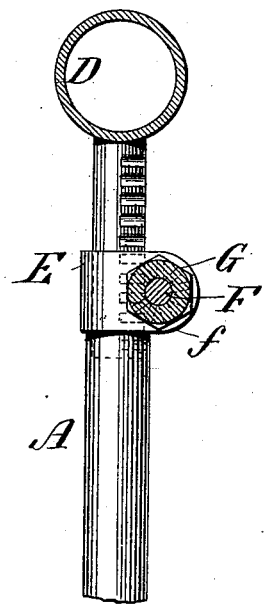
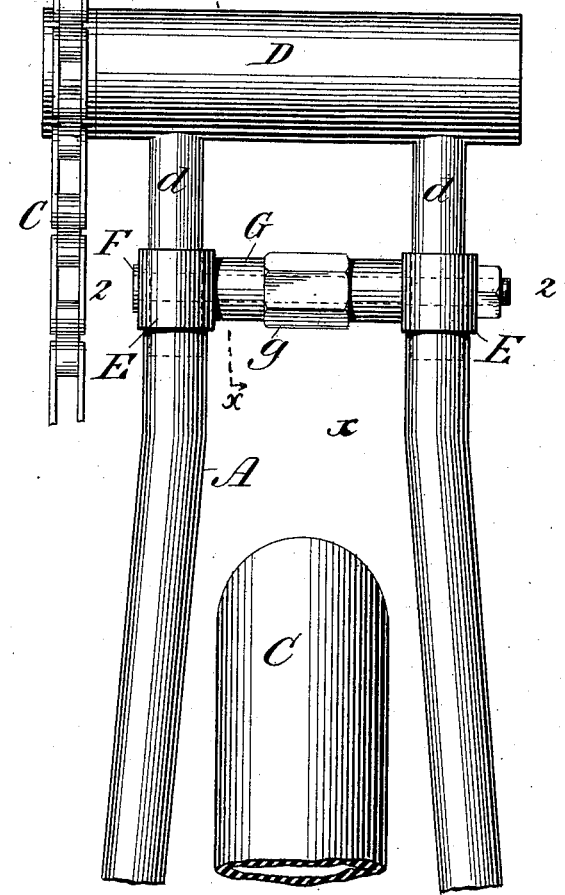
WITNESSES:
INVENTOR
Edwin S. Leaycraft
BY
Edwin H Brown
his ATTORNEY
THE NORRIS PETERS CO., PHOTO-LITHO., WASHINGTON, D. C.

UNITED STATES PATENT OFFICE.

EDWIN S. LEAYCRAFT, OF JERSEY CITY, NEW JERSEY.

BICYCLE-CHAIN ADJUSTMENT.

SPECIFICATION forming part of Letters Patent No. 601,346, dated March 29, 1898.

Application filed April 27, 1895. Serial No. 547,320. (No model.)

*To all whom it may concern:*

Be it known that I, EDWIN S. LEAYCRAFT, of Jersey City, New Jersey, have invented a certain new and useful Improvement in Bicycle-Chain Adjustments, of which the following is a specification.

I will describe a bicycle-chain adjustment embodying my improvement and then point out the novel features in the claims.

In the accompanying drawings, Figure 1 is a plan view of a bicycle-chain adjustment embodying my improvement. Fig. 2 is a longitudinal section taken on the plane of the line 2 2 of Fig. 1. Fig. 3 is a transverse section taken on the plane of the line $x\,x$ of Fig. 1 and looking in the direction of the arrow.

Similar letters of reference designate corresponding parts in all figures.

Referring to Figs. 1, 2, and 3, A are the side bars comprised in the bicycle-frame, extending from the journal-bearings of the rear wheel C forwardly on the opposite sides of the wheel toward the journal-bearings D of the forward sprocket-wheel, constituting the driving-wheel.

The side bars A are not rigidly secured to the journal-bearings of the driving-wheel, but are tubular at their forward ends that they may receive the ends of bars $d$, attached to and extending transversely from the bearings D. The bars $d$ fit snugly into the ends of the side bars A, but sufficiently loose to permit a backward and forward adjustment of these parts.

E is a split collar secured to the end of each side bar A and encircling the corresponding bar $d$. A shaft F passes across from one collar E to the other collar, entering apertures formed in flanges $f$, extending from each collar E. Journaled to the shaft F is a sleeve G, having its beveled ends formed with teeth which are adapted to engage with the notched surfaces forming racks on the bars $d$, the collars E being cut away that they may so engage. For the purpose of facilitating the rotation of the sleeve G it may be provided with facets at $g$, square or hexagonal in grouping, which may be grasped by the jaws of a wrench.

In order that the parts when adjusted may be locked in position, I thread the end of the shaft F, with which there is engaged a nut locking all the parts together when it is tightened up.

It will be seen that by my improvement I provide a part extending from the journal-bearings of the forward sprocket or driving wheel, a part extending from the bearings of the rear wheel, and means whereby these two parts may be adjusted relatively to each other to loosen or tighten the chain of a bicycle. Furthermore, this adjustment is secured by a movement of the parts squarely toward or away from each other without any lateral or unequal movement, keeping the axes of the driving-wheel and the rear wheel substantially parallel to each other throughout the adjustment. This is especially advantageous, since in the ordinary means provided for adjustment, consisting, essentially, of screws applied to the bearings of the rear wheel, it is necessary to manipulate first one and then the other of the screws to obtain a correct relative position of the parts, a process consuming considerable time.

Having described my invention, what I consider as new, and desire to secure by Letters Patent, is—

1. In combination with the side bars of a bicycle, a crank-axle bearing, toothed bars projecting therefrom and sliding in the side bars, split collars on the said side bars, a bolt passing through the split collars, a single sleeve mounted on said bolt and adapted to turn thereon and provided with teeth at each end engaging with the teeth of the bars projecting from the crank-axle bearing, and a nut screwed on said bolt to clamp the parts securely together, substantially as specified.

2. In a bicycle, the combination with a crank-axle bearing provided with toothed bars projecting therefrom and sliding in the side bars, split collars on said side bars, a bolt passing through these split collars, a single sleeve mounted on said bolt and adapted to turn thereon and provided with teeth at each end engaging with the teeth of the bars projecting from the crank-axle bearing, facets on said sleeve, and a nut screwed on said bolt for clamping the parts securely together, substantially as specified.

In testimony whereof I have signed my name to this specification in the presence of two subscribing witnesses.

EDWIN S. LEAYCRAFT.

Witnesses:
W. LAIRD GOLDSBOROUGH,
PIERSON L. WELLS.